(12) United States Patent
Corwith

(10) Patent No.: US 6,236,357 B1
(45) Date of Patent: May 22, 2001

(54) AUTOMATIC VEHICLE LOCATION SYSTEM AND METHOD WITH REDUCED BANDWIDTH REQUIREMENT

(75) Inventor: John Thomas Corwith, West Chicago, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/425,801

(22) Filed: Oct. 25, 1999

(51) Int. Cl.[7] ................................................. H04B 7/185
(52) U.S. Cl. ........................... 342/357.08; 342/357.07; 342/357.09
(58) Field of Search ................ 342/357.07, 357.08, 342/357.09, 357.13; 701/202, 206, 208, 209, 210, 215; 340/993, 995

(56) References Cited

U.S. PATENT DOCUMENTS 5,751,245 * 5/1998 Janky et al. ................... 342/357.07

* cited by examiner

Primary Examiner—Thomas H. Tarcza
Assistant Examiner—Fred H Mull

(57) ABSTRACT

An automatic vehicle location system obviates the need for frequent, scheduled position and movement change messages from field vehicles by having each field vehicle send position and movement update messages only when a change occurs in a monitored vehicle characteristic, and only when that change is accompanied by traversing a decision point on a stored electronic map. Sensors for monitoring such characteristics include, turn signal indicators, brake indicators, back-up indicators, speedometers, compasses and accelerometers. Upon reaching a decision point, and upon one of the signals from a sensor reaching a threshold, the Automatic Vehicle Location (AVL) box in the mobile unit of the field vehicle causes the Mobile Data Terminal (MDT) to transmit a position update message to a Dispatch Center. The Dispatch Center and the MDT contain identical maps, and extrapolate the vehicle's position between decision points according to identical algorithms.

24 Claims, 3 Drawing Sheets

AUTOMATIC VEHICLE LOCATION SYSTEM AND METHOD WITH REDUCED BANDWIDTH REQUIREMENT

BACKGROUND OF THE INVENTION

1. Field of the Invention

The present invention generally relates to automatic vehicle location systems. More particularly, the present invention relates to a reduction in the resource requirements for automatic vehicle location systems where the position of a large number of vehicles is frequently transmitted to a Dispatch Center.

2. Background

Automatic Vehicle Location (AVL) systems are used to keep track of a fleet of field vehicles for more efficient assignment of tasks in the field, monitoring productivity, and other reasons. Such systems typically have a Dispatch Center which receives a constant stream of position update messages that alert the Dispatch Center to any changes in the position of the vehicles. For example, each vehicle in the fleet sends a position update message to the Dispatch Center every 10 seconds.

Each field vehicle contains a mobile unit at least having an AVL box, a Mobile Data Terminal (MDT) usually in the form of a laptop or notebook computer, and a transceiver for broadcasting position update messages and for receiving information and instructions from the Dispatch Center.

The Dispatch Center of such a system includes a dispatch system, which stores logic and information (such as electronic maps) needed to receive and process position update messages from the fleet of field vehicles, and a transceiver for transmitting and receiving messages to and from the fleet of field vehicles.

A common use for an automatic vehicle location system is the tracking of public safety vehicles such as police cars, fire engines, paramedic vehicles and the like. In large municipalities with a great number of field vehicles to be monitored, the combination of a fixed bandwidth allocated for such services and the requirement that frequent position update messages be sent can cause "bottlenecks" and overwhelm the system, causing overall poor system performance.

There is a dire need to provide an AVL system with a lower bandwidth requirement for optimum system performance.

SUMMARY OF THE INVENTION

In view of the aforementioned shortcomings of the prior art, the present invention provides an automatic vehicle location method for monitoring by a Dispatch Center, the position of at least one vehicle. The method includes the steps of, via the Dispatch Center, tracking the changes in the position of a vehicle with respect to an electronic map, the map having predefined decision points, via a mobile unit in a vehicle, receiving position signals from the transmitter of a position system, and storing in the mobile unit, an identical map. The method also includes the steps of, via an automatic vehicle location (AVL) box in the mobile unit, monitoring vehicle movement change indicia, and upon reaching a decision point, transmitting position and movement update messages to the Dispatch Center only when one or more vehicle change indicia cross a predetermined threshold. Additionally, the method includes the step of, in both the Dispatch Center and the vehicle, extrapolating the position and movement of the vehicle between decision points by following a projected path on the map according to the same algorithm.

The present invention also provides an automatic vehicle location system adapted to monitor the position of at least one vehicle. The system includes a Dispatch Center adapted to track the changes in the position of a vehicle with respect to an electronic map, the map having predefined decision points, and a mobile unit in the vehicle adapted to receive position signals from the transmitter of a position system. The mobile unit is also adapted to store a map identical to the one stored by the Dispatch Center.

The system also includes an AVL box subsumed by the mobile unit and adapted to monitor vehicle movement change indicia, and extrapolators in the Dispatch Center and the mobile unit. The mobile unit is adapted to, upon reaching a decision point, transmit position and movement update messages to the Dispatch Center only when one or more vehicle change indicia cross a predetermined threshold. Both extrapolators are adapted to extrapolate the position and movement of the vehicle between decision points by following a projected path on the map according to the same algorithm.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 1:
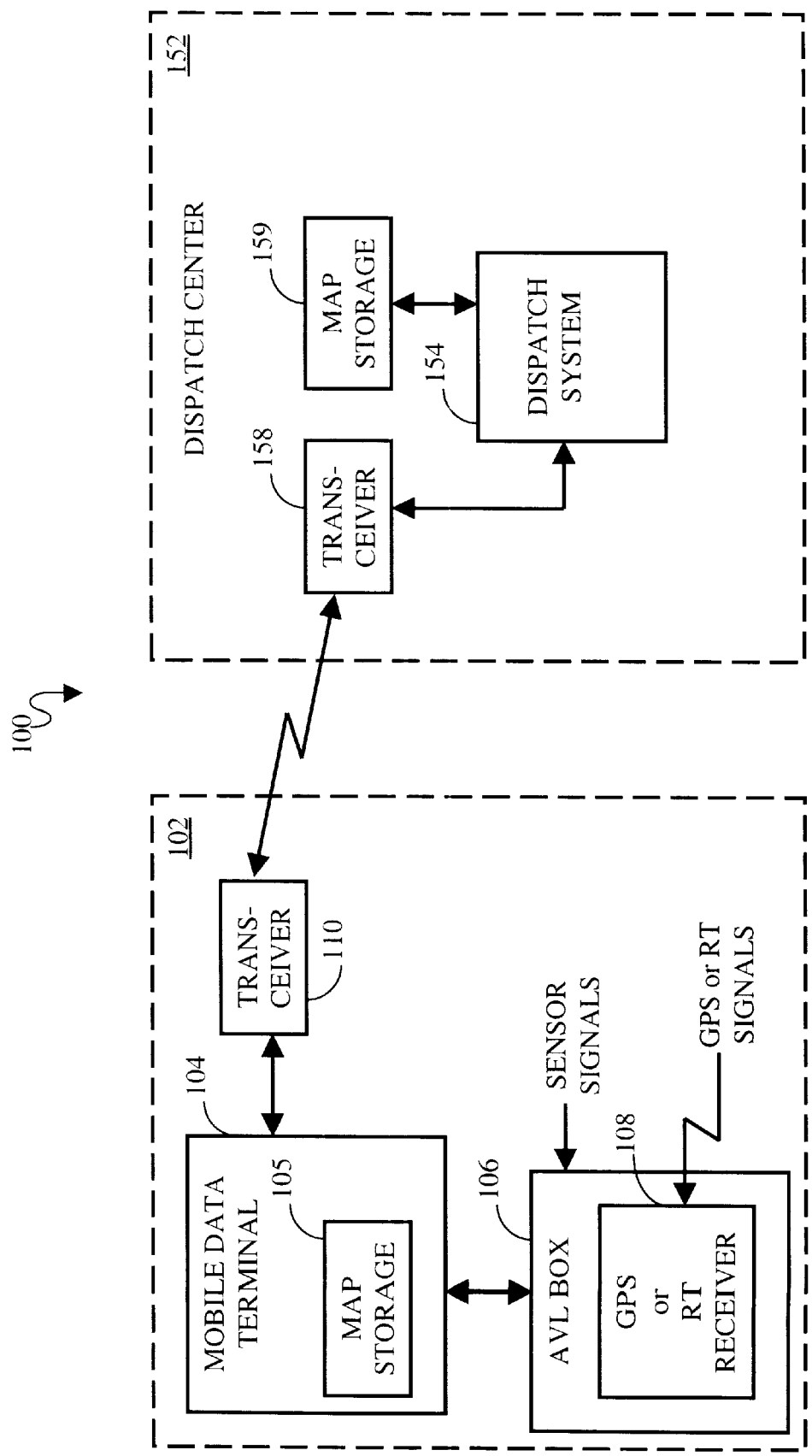
FIG. 1 is a schematic block diagram of the present-inventive automatic vehicle location system.

The schematic block diagram in FIG. 1 shows the basic components of the present-inventive automatic vehicle location system 100.

The automatic vehicle location system 100 nominally includes a Dispatch Center (CO) 152 and a number of mobile units 102 residing on field vehicles. A mobile unit at least includes a mobile data terminal (MDT) 104, an automatic vehicle location (AVL) unit 106, and a transceiver 110. In the preferred embodiment, the MDT 104 is a notebook computer capable of, inter alia, receiving and storing electronic maps, storing and parsing motor vehicle records, and other information-related to public safety functions.

The AVL box 106 provides position and movement information regarding the mobile unit to the MDT. In the preferred embodiment, the AVL box 106 contains either a Global Positioning System (GPS) receiver or a Radio Triangulation (RT) receiver 108 for determining the position and velocity of the mobile unit. As these technologies are well-known in the art, they will not be detailed here. In addition to receiving GPS or RT signals, the AVL box also receives information from various sensors located on the vehicle. The sensors are related to changes in the direction, movement or forces experienced by the vehicle. Such sensors as a compass, accelerometer, turn signal indicator, brake indicator, accelerator pedal, steering column or steering wheel, back-up indicator, and a speedometer are among those suitable for use in the AVL box. It will be appreciated by those skilled in the art that other sensors are also suitable for inclusion in the present-inventive system.

A transceiver 110 allows the mobile unit 102 to communicate via an RF link and periodically transmit position and movement update messages to the Dispatch Center to update the actual position and movement of the field vehicle.

The MDT also stores (in 105) an electronic map covering the areas traveled by the field vehicle. The mobile unit 102 not only tracks the actual movement of the field vehicle along the map according to the GPS or RT signals received, but also extrapolates to estimate the position and movement of the field vehicle between the receipt of GPS or RT signals according to an extrapolation algorithm. An important feature of the present invention is both the storage of an identical map and the use of an identical extrapolation algorithm by the Dispatch Center as described infra. As a result of using the same map and the same extrapolation algorithm, the extrapolated position and movement of the field vehicle will be identical in both the mobile unit and the Dispatch Center. Also, immediately after the receipt of update messages, the actual position in both the mobile unit and the Dispatch Center is synchronized.

The Dispatch Center (CO) 152 nominally includes a dispatch system 154 and a transceiver 158. The dispatch system 154 contains control logic and an extensive storage for storing public safety information such as maps covering the jurisdiction, motor vehicle information, and criminal justice information. The transceiver 158 allows the CO to communicate via an RF link to the mobile units 102. As was previously mentioned, the CO stores an identical map (in area 159) and uses an identical extrapolation algorithm to that of the field vehicle being tracked.

To summarize the operation of the present invention, the CO 152 and the mobile unit 102 store identical maps covering the area to be traveled by the field vehicle. When the mobile unit 102 receives position signals (GPS or RT), the mobile unit 102 updates the actual position of the field vehicle on the stored map. The maps have decision points, which when reached (by the actual field vehicle position) require the mobile unit 102 to decide whether to transmit a position update message to the CO 152. Decision points are typically located at each intersection of streets on the map, although a more frequent placement of decision points is possible. At a new decision point the mobile unit uses stored logic and information from the AVL box 106 to determine when to transmit a position update message. That is, the mobile unit may decide to send a position update message to the CO when a monitored characteristic crosses a predetermined threshold.

The mobile unit and the CO use the same extrapolation algorithm to extrapolate the position of the field vehicle between the broadcast of position update messages. Therefore, both the mobile unit and the CO will contain identical extrapolated field vehicle position estimates. Each time the mobile unit transmits a position update message to the CO, the extrapolated position (in both the mobile unit and the CO) is set equal to the actual position. Extrapolation then begins anew.

Between decision points, no position update messages are transmitted to the CO (and extrapolation continues) unless one or more contingencies occur. If no new position update message has been sent during a predefined maximum time period (e.g., 1 minute), the mobile unit automatically transmits a new position update message. Also, when the mobile unit receives a new GPS or RT signal, it compares the new actual position with the extrapolated position. If the difference between the actual and extrapolated positions exceeds a predefined maximum (e.g., 20 percent as measured from the previous decision point), a new position update message is automatically transmit to the CO. The latter feature can be made to function only when the actual position of the field vehicle is between two map decision points which are apart by at least a predefined minimum distance (e.g., 2 miles). The latter feature prevents the system 100 from unnecessarily broadcasting position update messages where the field vehicle has stopped or is slow moving through a short street block.

Figure 2:
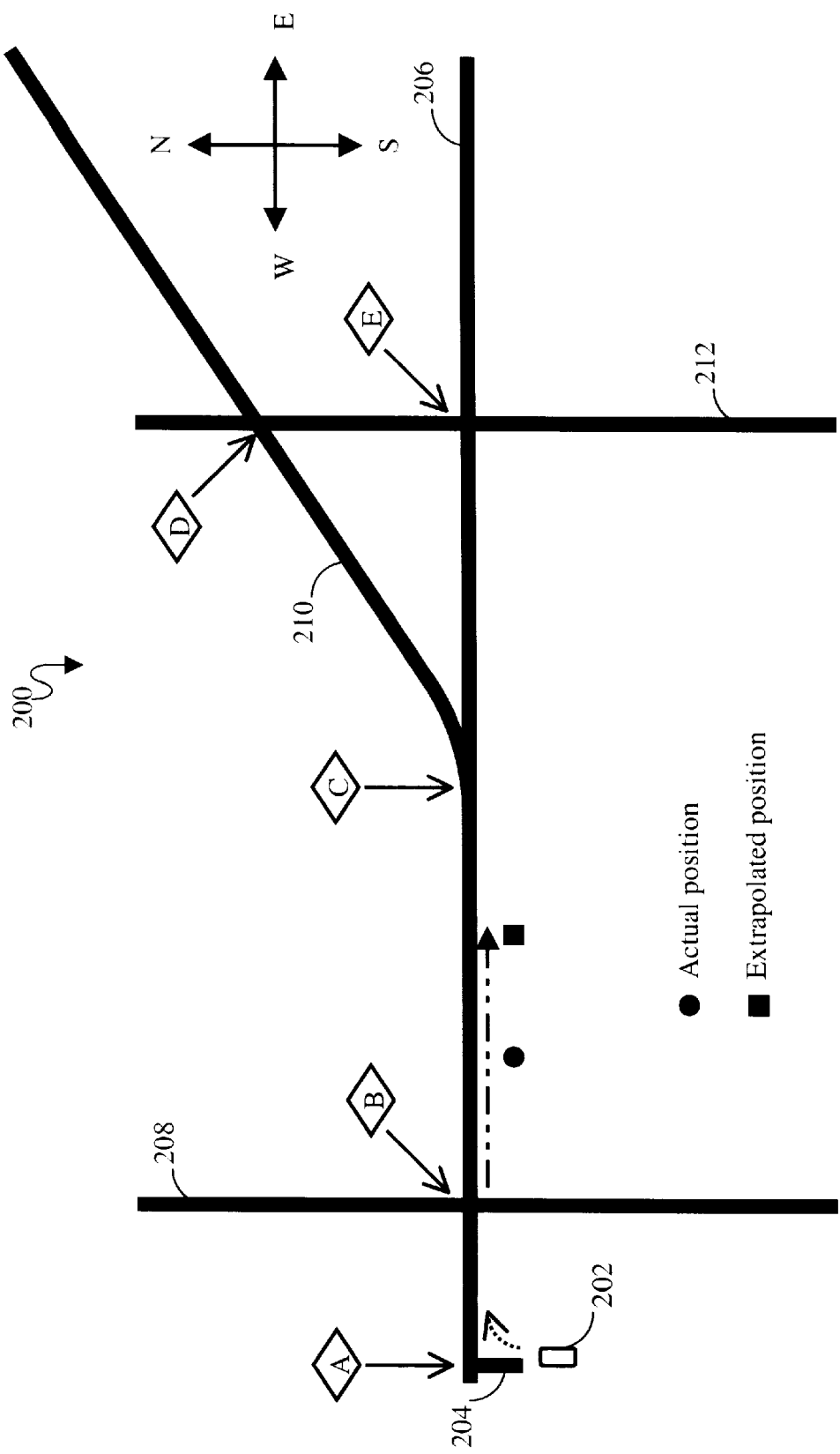
FIG. 2 is an illustration of a sample electronic map used for vehicle tracking.

FIG. 2 graphically depicts an area of a sample electronic map 200 covering the region to be traveled by a field vehicle 202. Both the mobile unit and the CO track and extrapolate field vehicle movement using the map 200. In this simple example, the area of the map contains an east-west street 206, north-south streets 208 and 212, a northeast-southwest street 210, and a driveway 204, perhaps leading away from a parking lot surrounding the CO. Several decision points A, B, C, D and E are located throughout the area.

Also shown on the map are examples of the actual position (represented by a small, solid circle) of the field vehicle and the extrapolated position (represented by a small, solid square) of the field vehicle. At the start of a trip, for example, the field vehicle 202 leaves the driveway 204 and reaches decision point A, before turning right onto Street 206. At decision point A, the AVL box indicates to the MDT that the field vehicle 202 is turning right, whereupon a position and movement update message is transmitted to the CO indicating the field vehicle is now headed East on Street 206. Meanwhile, both the mobile unit and the CO begin to extrapolate the position of the field vehicle in an eastward projection along Street 206. Both the mobile unit and the CO will presume that the field vehicle is moving along Street 206 unless otherwise indicated.

When the field vehicle 202 reaches decision point B, the mobile unit determines, based upon signals from the AVL box 106, whether a change in movement indicates a possible turn onto Street 208. The combination of braking and a large movement of the steering wheel might indicate this. If the AVL box indicates that the field vehicle has turned onto Street 208, a new position and movement update message is transmitted to the CO. If the AVL box does not indicate a possible change in Streets, the field vehicle will be presumed to continue traveling on Street 206 through the intersection, and no position and movement update message will be transmitted.

After every update message transmission, synchronized timers in the mobile unit and Dispatch Center are reset. If the timers reaches a maximum time period before a new update message is transmitted, an update message is automatically transmitted if the speed of the vehicle has changed beyond a threshold. For example, if the field vehicle is stopped in traffic between decision points B and C for over 1 minute in the preferred embodiment, a new update message is automatically transmitted if the vehicle was not at rest hen the previous update message was broadcast. However, if the vehicle as at rest at when the previous update message was sent, and is still at rest when the maximum time period is reached, no new update message is sent. In the latter instance the Dispatch Center assumes that since it has not received an update message at the end of the maximum time period, the vehicle has not moved.

In some cases, the extrapolated position will begin to lead the actual position by a considerable amount. To prevent large disparities in the extrapolated and actual positions, any difference over a specified amount triggers an automatic transmission of the current known position and movement.

Another safeguard for preventing large disparities between the extrapolated and actual positions requires extrapolation to cease when the extrapolated position reaches a new decision point. The latter safeguard does not function, however, unless the distance between the previous decision point and the next projected decision point is above a minimum amount. Therefore, extrapolation might continue through decision point B ahead of the actual position, while extrapolation might be halted at decision point C until a new update message is transmitted.

At decision point C, absent any indication of a movement change, the system will presume that the field vehicle continues eastward on Street 206. However, should the AVL box indicate a possible change in position and movement at decision point C, a new update message will be transmitted to ascertain the field vehicle's new position and movement (i.e., Street 210 or Street 206).

Decision points D and E are handled in the same manner as decision points A, B and C.

Figure 3:
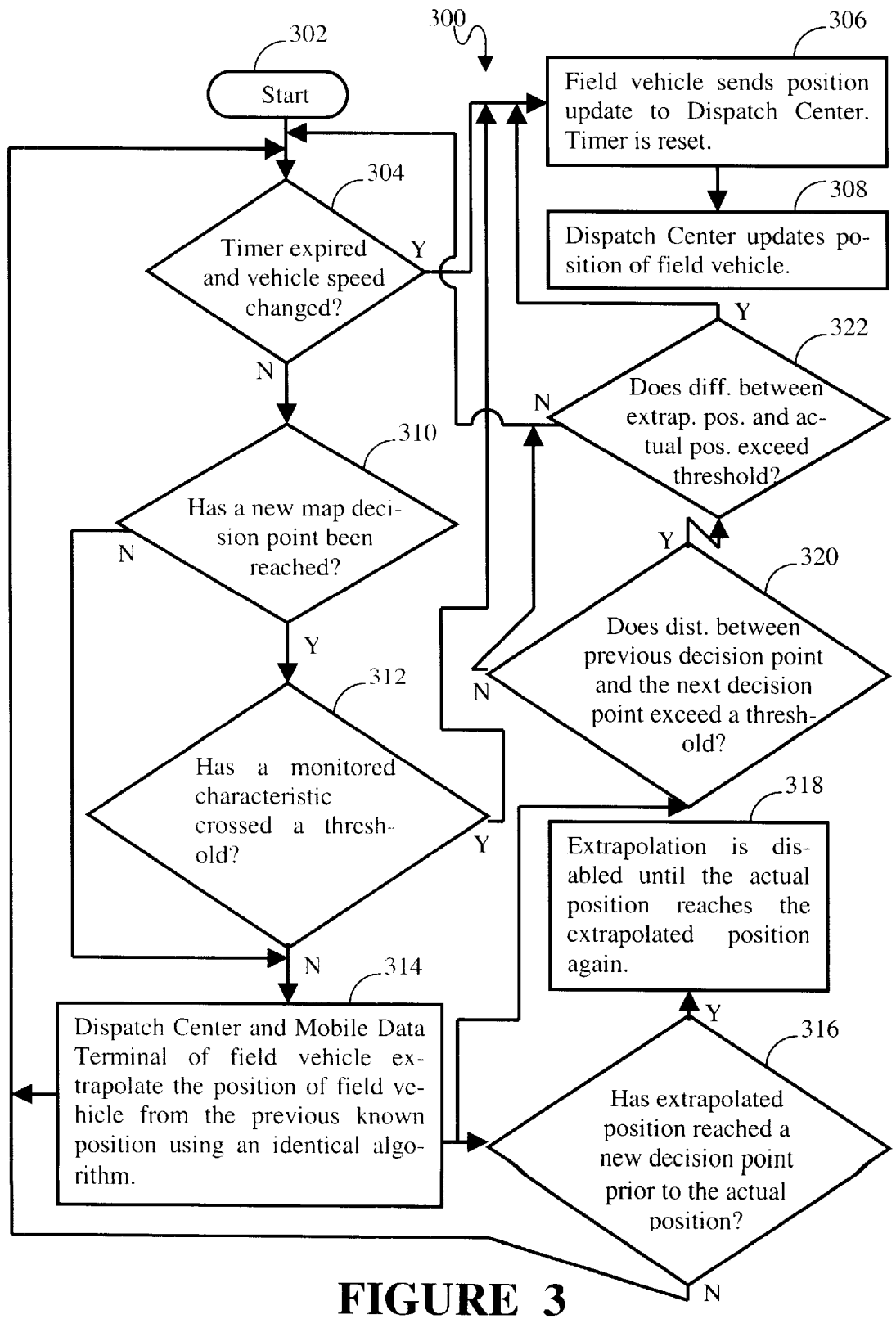
FIG. 3 is a flowchart/algorithm detailing the operation of the present-inventive automatic vehicle location system and method.

FIG. 3 graphically depicts the algorithm 300 used by the present inventive automatic vehicle location system and method. After the start 302 of the algorithm, the MDT ascertains whether a maximum time interval timer (present in both the mobile unit and the Dispatch Center) has expired prior to any position and movement update message having been sent (Step 204). If the timer has expired and the speed of the vehicle has changed since the previous update message was sent, the mobile unit sends a new position update message to the CO and resets the timer (Step 306). After the position update message is transmitted, both the mobile unit and the CO update the actual position of the field vehicle in Step 308.

If the timer has not expired, the algorithm determines whether a new decision point has been reached in Step 310. If so, the mobile unit checks the AVL box for changes in monitored characteristics in Step 312. If not, the algorithm advances to Step 314 to require the mobile unit and the CO to identically extrapolate the position of the field vehicle.

After a new decision point has been reached and upon a predefined change in a monitored characteristic or characteristics by the AVL box, the mobile unit transmits a new position and movement update message to the CO (Steps 310, 312 and 306). After Step 314, the algorithm moves to Steps 316 and 320. In Steps 316 and 318, if the extrapolated position has reached a new decision point before the actual position, extrapolation is temporarily disabled until a new position update message is transmitted.

In Steps 320 and 322, if the distance between the previous decision point and the next projected decision point exceeds a predefined maximum, the mobile unit will transmit a new update message if the difference between the extrapolated position and the actual position exceeds another predefined maximum. Otherwise, the algorithm returns to Step 304.

Variations and modifications of the present invention are possible, given the above description. However, all variations and modifications which are obvious to those skilled in the art to which the present invention pertains are considered to be within the scope of the protection granted by this Letters Patent.

What is claimed is:

1. An automatic vehicle location method for monitoring by a Dispatch Center, the position of at least one vehicle comprising the steps of:

via the Dispatch Center, tracking the changes in the position of a vehicle with respect to an electronic map, said map having predefined decision points;

via a mobile unit in a vehicle, receiving position signals from the transmitter of a position system;

storing in said mobile unit, an identical map;

via an automatic vehicle location (AVL) box in the mobile unit, monitoring vehicle movement change indicia;

upon reaching a decision point, transmitting position and movement update messages to the Dispatch Center only when one or more vehicle change indicia cross a predetermined threshold; and in both the Dispatch Center and said vehicle, extrapolating the position and movement of said vehicle between decision points by following a projected path on said map according to the same algorithm.

2. The method in claim 1, further comprising the steps of:

via said mobile unit, comparing the actual position of said vehicle to an extrapolated estimate of the position of said vehicle; and carrying out said transmitting step only when the difference between the actual and extrapolated estimate of the vehicle position exceeds a predefined threshold.

3. The method in claim 2 wherein extrapolation ceases upon the extrapolated position reaching a decision point when the extrapolated position leads the actual position on a projected path, and extrapolation resumes after the actual position has also reached the decision point.

4. The method in claim 1, further comprising the step of:

carrying out said transmitting step only when the distance between the last decision point reached by said vehicle and the next decision point according to the projected path exceeds a predefined minimum.

5. The method in claim 4 wherein extrapolation ceases upon the extrapolated position reaching a decision point when the extrapolated position leads the actual position on a projected path, and extrapolation resumes after the actual position has also reached the decision point.

6. The method in claim 1, further comprising the steps of:

via said mobile unit, comparing the actual position of said vehicle to an extrapolated estimate of the position of said vehicle; and carrying out said transmitting step only when the distance between the last decision point reached by said vehicle and the next decision point according to the projected path exceeds a predefined minimum, and only when the difference between the actual and extrapolated estimate of the vehicle position exceeds a predefined threshold.

7. The method in claim 6 wherein extrapolation ceases upon the extrapolated position reaching a decision point when the extrapolated position leads the actual position on a projected path, and extrapolation resumes after the actual position has also reached the decision point.

8. The method in claim 7 further comprising the steps of:

upon the transmission of each update message, resetting and starting a counter; and when the counter reaches a predetermined maximum count, transmitting a new update message if the change in vehicle speed since the last update message reaches a predefined threshold.

9. The method in claim 1 wherein extrapolation ceases upon the extrapolated position reaching a decision point when the extrapolated position leads the actual position on a projected path, and extrapolation resumes after the actual position has also reached the decision point.

10. The method in claim 1 further comprising the steps of:
upon the transmission of each update message, resetting and starting a counter; and
when the counter reaches a predetermined maximum count, transmitting a new update message if the change in vehicle speed since the last update message reaches a predefined threshold.

11. The method in claim 1, wherein said position system is the Global Positioning System (GPS).

12. The method in claim 1, wherein said position system utilizes Radio Triangulation (RT) technology.

13. An automatic vehicle location system adapted to monitor the position of at least one vehicle comprising:
a Dispatch Center adapted to track the changes in the position of a vehicle with respect to an electronic map, said map having predefined decision points;
a mobile unit in said vehicle adapted to receive position signals from the transmitter of a position system, and said mobile unit being adapted to store an identical map;
an automatic vehicle location (AVL) box subsumed by said mobile unit, and adapted to monitor vehicle movement change indicia;
an extrapolator subsumed by said Dispatch Center; and
an extrapolator subsumed by said mobile unit;
wherein said mobile unit is adapted to, upon reaching a decision point, transmit position and movement update messages to the Dispatch Center only when one or more vehicle change indicia cross a predetermined threshold; and
wherein both extrapolators are adapted to extrapolate the position and movement of said vehicle between decision points by following a projected path on said map according to the same algorithm.

14. The system in claim 13, wherein said mobile unit comprises a comparator adapted to compare the actual position of said vehicle to an extrapolated estimate of the position of said vehicle, and wherein said mobile unit is adapted to transmit update messages only when the difference between the actual and extrapolated estimate of the vehicle position exceeds a predefined threshold.

15. The system in claim 14 wherein said extrapolators cease to extrapolate upon the extrapolated position reaching a decision point when the extrapolated position leads the actual position on a projected path, and said extrapolators resume extrapolation after the actual position has also reached the decision point.

16. The system in claim 13, wherein said mobile unit is further adapted to transmit update messages only when the distance between the last decision point reached by said vehicle and the next decision point according to the projected path exceeds a predefined minimum.

17. The system in claim 16 wherein said extrapolators cease to extrapolate upon the extrapolated position reaching a decision point when the extrapolated position leads the actual position on a projected path, and said extrapolators resume extrapolation after the actual position has also reached the decision point.

18. The system in claim 13, wherein said mobile unit further comprises a comparator adapted to compare the actual position of said vehicle to an extrapolated estimate of the position of said vehicle, and said mobile unit is further adapted to transmit messages only when the distance between the last decision point reached by said vehicle and the next decision point according to the projected path exceeds a predefined minimum, and only when the difference between the actual and extrapolated estimate of the vehicle position exceeds a predefined threshold.

19. The system in claim 18 wherein said extrapolators cease to extrapolate upon the extrapolated position reaching a decision point when the extrapolated position leads the actual position on a projected path, and said extrapolators resume extrapolation after the actual position has also reached the decision point.

20. The system in claim 19 wherein said mobile unit and said Dispatch Center further comprise synchronized counters adapted to be reset and restart upon the transmission of each update message, wherein
upon said counters reaching a predetermined maximum count, the counter in said mobile unit triggers the transmission of a new update message if the change in vehicle speed since the last update message reaches a predefined threshold.

21. The system in claim 13 wherein said extrapolators cease to extrapolate upon the extrapolated position reaching a decision point when the extrapolated position leads the actual position on a projected path, and said extrapolators resume extrapolation after the actual position has also reached the decision point.

22. The system in claim 13 wherein said mobile unit and said Dispatch Center further comprise synchronized counters adapted to be reset and restart upon the transmission of each update message, wherein
upon said counters reaching a predetermined maximum count, the counter in said mobile unit triggers the transmission of a new update message if the change in vehicle speed since the last update message reaches a predefined threshold.

23. The system in claim 13, wherein said position system is the Global Positioning System (GPS).

24. The system in claim 13, wherein said position system utilizes Radio Triangulation (RT) technology.

* * * * *